No. 742,566. PATENTED OCT. 27, 1903.
G. S. BILLMAN.
AUTOMATIC GAS ENGINE STARTER.
APPLICATION FILED AUG. 28, 1902.
NO MODEL.
3 SHEETS—SHEET 1.
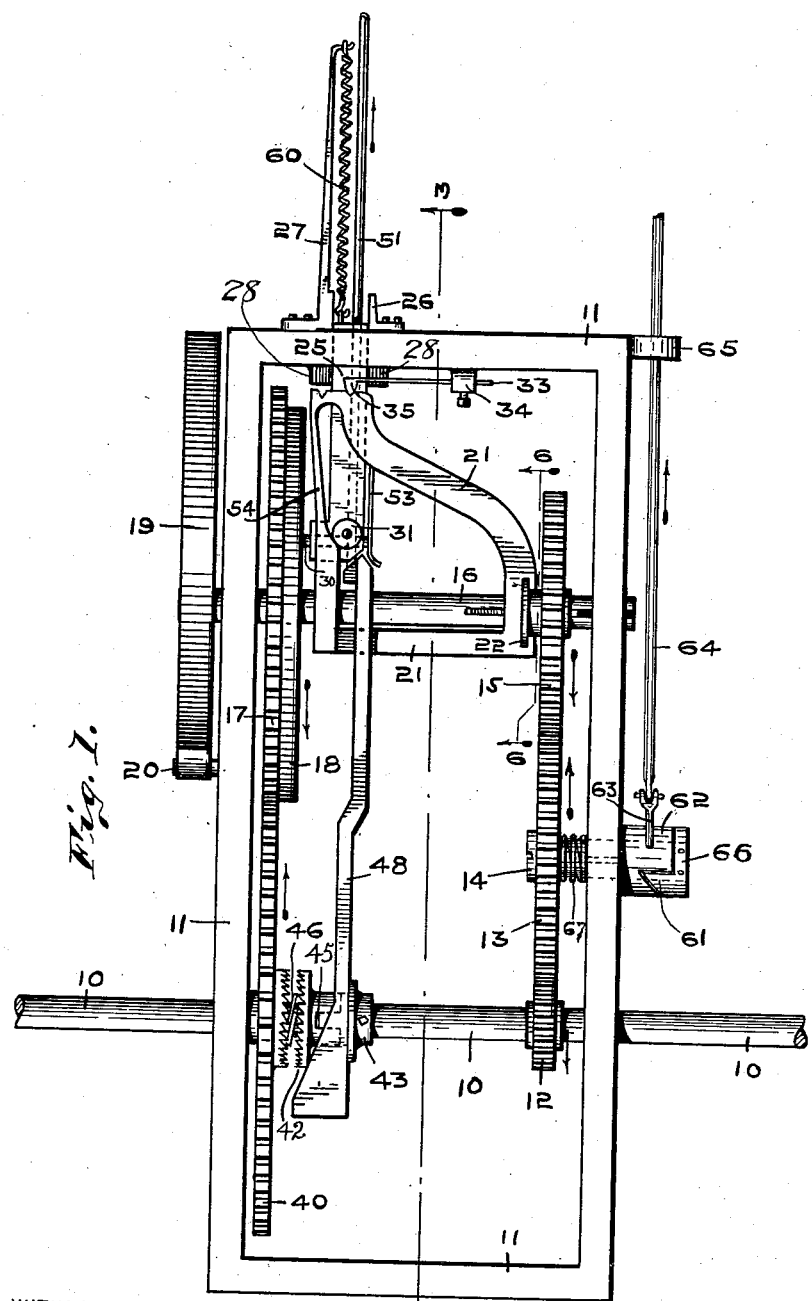

No. 742,566. PATENTED OCT. 27, 1903.
G. S. BILLMAN.
AUTOMATIC GAS ENGINE STARTER.
APPLICATION FILED AUG. 28, 1902.
NO MODEL.
3 SHEETS—SHEET 2.
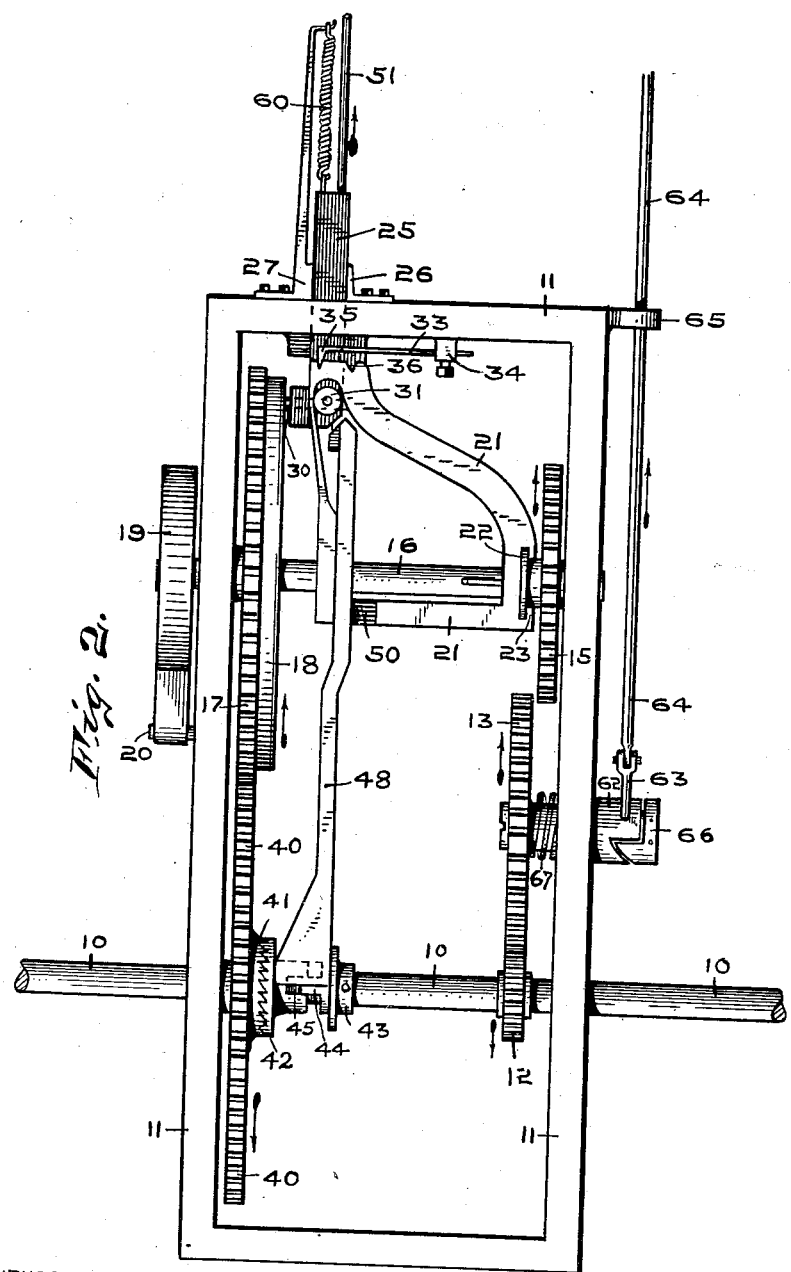

No. 742,566. PATENTED OCT. 27, 1903.
G. S. BILLMAN.
AUTOMATIC GAS ENGINE STARTER.
APPLICATION FILED AUG. 28, 1902.
NO MODEL. 3 SHEETS—SHEET 3.
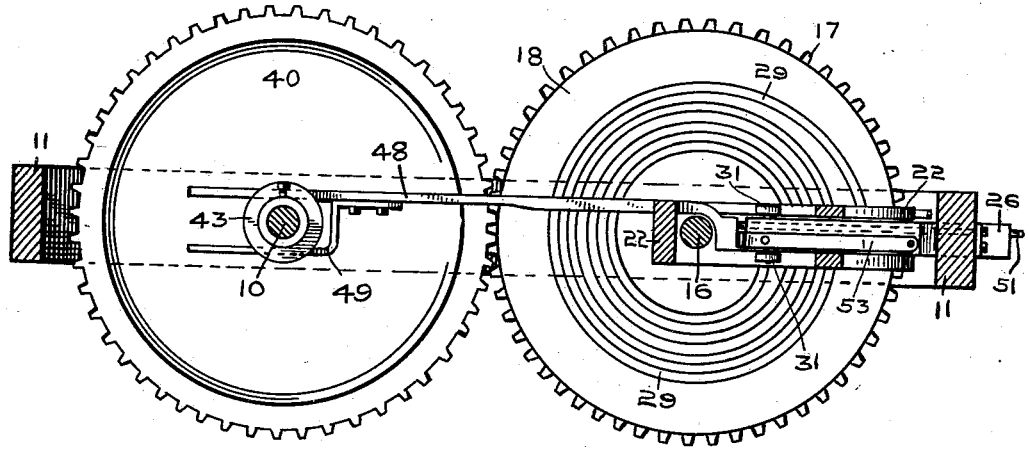
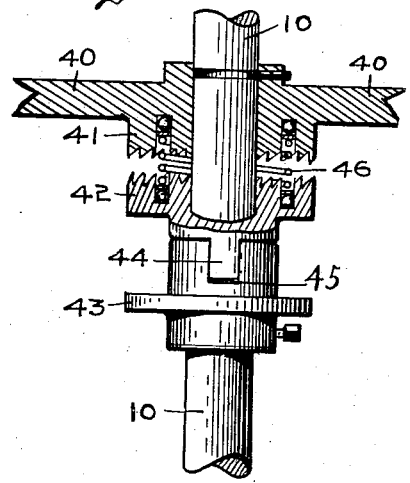
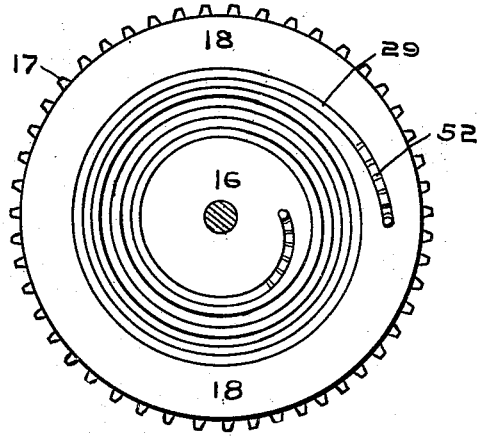
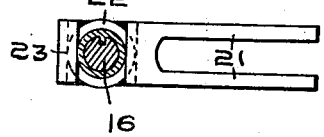
WITNESSES: F. W. Hoerner. Nellie Allemong.
INVENTOR Gustus S. Billman BY V. H. Lockwood ATTORNEY No. 742,566.

Patented October 27, 1903.

UNITED STATES PATENT OFFICE.

GUSTUS S. BILLMAN, OF INDIANAPOLIS, INDIANA.

AUTOMATIC GAS-ENGINE STARTER.

SPECIFICATION forming part of Letters Patent No. 742,566, dated October 27, 1903.

Application filed August 28, 1902. Serial No. 121,406. (No model.)

*To all whom it may concern:*

Be it known that I, GUSTUS S. BILLMAN, of Indianapolis, county of Marion, and State of Indiana, have invented a certain new and useful Automatic Gas-Engine Starter; and I do hereby declare that the following is a full, clear, and exact description thereof, reference being had to the accompanying drawings, in which like numerals refer to like parts.

The object of this invention is to provide means for automatically starting an explosive-engine of the gas, gasolene, or other type after the engine has been once put under way.

The nature of this invention will be understood from the accompanying drawings and the following description of one form of device for carrying out this invention.

In the drawings, Figure 1 is a plan view of the automatic starting apparatus with some of the parts which are connected with the engine or need to be driven by the engine broken away and showing the mechanism in position before the engine has wound up or actuated the automatic device. Fig. 2 is the same with the parts in position after the spring has been wound up and power generated in the starting device. Fig. 3 is a section on the line 3 3 of Fig. 1. Fig. 4 is a detail of the clutch mechanism shown in Fig. 1, part being in horizontal central section. Fig. 5 is an elevation of the inner side of a cam-wheel, showing a cam-groove. Fig. 6 is a section on the line 6 6 of Fig. 1.

The device herein shown is adapted to be attached to an automobile or any other machine which may be driven by an explosive-engine of any type. The shaft 10 is the main shaft driven by the gas-engine, and it may be one of the axles of the automobile or shafts of any machine driven by the gas-engine. A frame 11 is connected in any desired way with the machine or gas-engine, it being rigid with relation to the shaft 10. Therefore the mechanism embodying this invention will actuate the gas-engine by operating the shaft 10, as will hereinafter be explained, and likewise the gas-engine will wind up or place the automatic starting mechanism in position for operation through the said shaft 10.

A pinion 12 is rigidly secured on the shaft 10, that meshes with the gear 13, that is loosely mounted on a spindle 14, that is laterally slidable in the bearing shown by dotted lines in one side of the frame 11. The exact arrangement and mounting of this spindle 14 will be hereinafter explained. The gear 13 meshes with and drives another gear 15, that is on the counter-shaft 16, which is mounted in suitable bearings in the sides of the frame 11. The gear 15 is laterally slidable on said shaft 16 by a feather construction of a common type, whereby the gear 15 will drive the shaft 16 and can be laterally moved out of gear with the gear 13. On the shaft 16 there is also secured a combination-gear 17 and cam-wheel 18. These are shown united, but may be separated, and there is also on said shaft 16 a motor-spring 19, that at one end is secured to the shaft and at the other end is secured to the pin 20, that is stationary in the frame 11.

With the construction above described the ordinary operation of a gas-engine will through the gear specified wind up the spring 19 from the position shown in Fig. 1 to that shown in Fig. 2. The winding up of such spring is stopped automatically by reason of the following construction: A loosely-mounted and laterally-slidable frame 21 is placed on the shaft 16 and is so connected with the gear 15 that it may move that gear out of mesh with the gear 13, and then the operation of the engine will not further wind up the spring. The connection between the slidable frame 21 and gear 15 herein shown consists of a disk 22 on the hub of the gear 15, that fits into a notch at 23 in said slidable frame.

The frame 21 is moved laterally by the following means: A reciprocating bar 25 is mounted in the frame between the guide-pieces 26 and 27 on the outside and a pair of guides 28 on the inside shaft. The inner end of said bar 25 will extend beside the cam-wheel 18. The cam-groove 29 is made in the side of the cam-wheel, and a pin 30 extends from the bar 25 into said groove. The cam-groove is in the form of a coil or spiral with one end near the center of the cam-wheel and the other near the periphery thereof, so that as said wheel is operated by the engine while winding up the spring 19 the cam-wheel will force the pin 30, which is in the cam-groove, gradually downward from the position shown in Fig. 1 to that shown in Fig. 2, and said downward movement of the pin will also cause the downward movement of the bar 25, and a roller 31 on the bar 25 comes into engagement as it moves downward with the inclined inner surface at 54 of the slidable frame 21, and thereby said frame is moved laterally from the position shown in Fig. 1 to that shown in Fig. 2. The flat spring 33, that is secured in the post 34, holds the slidable frame in either position by means of the head 35 engaging the notches 36. This is a weak spring, so that it will not prevent the movement of the slidable frame in either direction when force is applied to said frame, but will prevent its lateral movement from accident or jolting.

With the parts in the position shown in Fig. 2 the spring has been wound up by the engine and a part of the winding mechanism thrown out of gear, so that the further operation of the engine will have no effect on the winding mechanism. The shaft 10 and the wheels 12 and 13 will continue to operate, but being out of gear with the gear 15 will have no effect on the other mechanism.

The means whereby this apparatus starts the engine will now be explained. The wheel 17 on the shaft 16 when released will drive the gear 40, that is loosely mounted on the main shaft 10, and the clutch mechanism 41 is there provided for coupling said gear with said shaft. The clutch mechanism shown consists of the toothed hub 41 on the wheel with a companion toothed disk 42, that is laterally slidable, in connection with the stationary disk 43, said stationary disk having a projection 44, that enters the notch 45 in the hub of the disk 42. The spiral spring 46 lies between the two jaws of the clutch to press them apart and disengage them when no force is applied to cause their engagement. While the machine is being wound up by the operation of the engine, as has been heretofore described, the gears 17 and 18 revolve in the direction of the arrows in Fig. 1; but when said wheels are driven by the spring 19 they revolve in an opposite direction, as shown by the arrows in Fig. 2. While the machine is being wound up, therefore, the clutch is disengaged from the gear 40, as seen in Fig. 1. The jaws of the clutch are brought into engagement by the inclined surface of the widened end of the bar 48, the widened end of said bar resting between the disk 42 and the disk 44, so that when said bar is in the position shown in Fig. 1 it will not interfere with the clutch mechanism; but when drawn in the position shown in Fig. 2 it will throw the gear 40 into connection with the shaft 10. The bar 48 has secured to it at one end, as shown in Fig. 3, the bent bar 49, whereby the bar 48 is held loosely on the shaft 10. The other end of the bar 48 rests in the guiding-notch 50 in the slidable frame 21. The bar 48 is actuated by hand or foot through the rod 51, that at its inner end is connected with the bar 48. When it is desired, therefore, to start the gas-engine, this rod 51 is drawn in the direction of the arrows shown in Fig. 2. Such movement of the rod 51 not only operates the clutch mechanism, as has been described, but it also releases the pin 30 from the teeth 52 in the cam-groove by drawing the beveled end of the bar 48 against the turned end of the spring 53, which holds said pin 30 tightly in the groove. The spring 53 is secured to the side of the bar 25, as shown in Fig. 3, and presses the pin 30 toward the cam-wheel, so as to hold the pin in the locking-notches 52. Therefore when the rod 51 is pulled the clutch mechanism is actuated, and immediately after the pin 30 is released from the holding locking-notches 52, and then the spring 19 immediately actuates the shaft 16, gear 17, gear 40, and shaft 10, which will drive the gas-engine and cause the igniter to begin operation. As the spring 19 operates and drives the gear 17, and consequently the cam-wheel 18, the pin 30 will run backward through the groove 29 to its innermost position and carry with it the bar 25, which will move the slidable frame 21 back into its normal position, as shown in Fig. 1. This movement of the frame is effected by the roller 31 engaging the inclined inner surface 54. This will bring the parts back to their normal position, and the further operation of the engine will again wind up the spring 19 and put the parts back into the position shown in Fig. 2 ready for use after the engine is again stopped for starting the same.

In order to save the machine in case of the pin 30 breaking or from the destruction by its connection with the engine, a spring 60 is provided, that is at one end secured to the outer end of the arm or post 27 and at the other end is connected with the reciprocating bar 25. Therefore if the pin 30 should break the spring 60 will draw the bar 25 immediately to the position shown in Fig. 2, which would throw the gear 15 out of mesh with the gear 13, and the operation of the engine would not affect this part of the mechanism.

Another precautional means is provided for throwing the mechanism out of gear with the engine when the spring 19 for some reason is run down or not wound up and the engine is stationary or not under operation and the sparker-circuit is open. When the engine is first started—say after its purchase—and mounted, it can be started in the usual way, because then the spring 19 has not been wound up. When thus initially started by hand, if the sparker-circuit is permanently broken of course the sparker will not be started to operate by any amount of operation of the engine. This may happen when the operator thinks that the sparker-circuit is closed, whereas, as a fact, it is not. Therefore the gear 13 is mounted on the laterally-slidable spindle 14, that has on one end a head 66 with an inclined tooth 61, like a ratchet-tooth.

An oscillatory piece 62 is mounted loosely on said spindle 14 between the head 66 and the framework 11, and it has on it the crank 63, connected with the rod 64, that runs through the guide 65 to some place that is convenient to operate. When rod 64 is drawn in the direction of the arrow in Fig. 1, it is obvious that the head 66 will be pushed to the right, and therefore the gear 14 be thrown out of mesh with the pinion 12. When the rod 64 is released, the spring 67 will throw the parts back into their normal position.

What I claim as my invention, and desire to secure by Letters Patent, is—

1. An automatic starter for explosive-engines including a shaft, a spring that is wound by said shaft, a slidable gear on said shaft for actuating it and winding the spring, a gear connection between the engine and said slidable gear, a frame slidably mounted on said shaft that is loosely connected with said slidable gear, a disk secured to said shaft having a spiral groove in one face thereof, and a reciprocating means provided with a pin extending into said groove that is actuated by said cam-disk and actuates said slidable frame, whereby said spring-winding mechanism is thrown out of operation when the spring is wound.

2. An automatic starter for explosive-engines including a shaft, a spring that is wound by said shaft, a slidable gear on said shaft for actuating it and winding the spring, a gear connection between the engine and said slidable gear, a frame slidably mounted on said shaft that is loosely connected with said slidable gear, a disk secured to said shaft having a spiral groove in one face thereof, a reciprocating means provided with a pin extending into said groove that is actuated by said cam-disk and actuates said slidable frame, whereby said spring-winding mechanism is thrown out of operation when the spring is wound, and notches at the extreme end of said cam-groove for holding the spring in tension.

3. An automatic starter for explosive-engines including a shaft, a spring that is wound by said shaft, a slidable gear on said shaft for actuating it and winding the spring, a gear connection between the engine and said slidable gear, a frame slidably mounted on said shaft that is loosely connected with said slidable gear, a disk secured to said shaft having a spiral groove in one face thereof, a reciprocating means provided with a pin extending into said groove that is actuated by said cam-disk, and actuates said slidable frame, whereby said spring-winding mechanism is thrown out of operation when the spring is wound, and a spring-controlled means for holding said slidable frame in either of its two positions.

4. An automatic starter for explosive-engines including a shaft, a spring that is wound by said shaft, a slidable gear on said shaft for actuating it and winding the spring, a gear connection between the engine and said slidable gear, a frame slidably mounted on said shaft that is loosely connected with said slidable gear, a disk secured to said shaft having a spiral groove in one face thereof, a reciprocating means provided with a pin extending into said groove that is actuated by said cam-disk and actuates said slidable frame, whereby said spring-winding mechanism is thrown out of operation when the spring is wound, a gear for guiding said slidable gear, and external actuating means for throwing said driving-gear out of mesh with said slidable gear.

5. An automatic starter for explosive-engines including a shaft, a spring that is wound by said shaft, a gear mounted on said shaft by a spline so as to be laterally movable, a gear connection between the engine and said slidable gear, a frame slidably mounted on said shaft that is loosely connected with said slidable gear, said frame having an inclined surface, a disk secured to said shaft having a spiral groove in the face thereof adjacent said slidable frame, notches in the extreme end of said groove, a bar mounted in the framework of the machine and reciprocating in a line parallel to the base of said cam-disk, a pin extending from said bar into the groove of said cam-disk whereby said bar will be reciprocated as the spring is being wound, and a projection from said reciprocable bar that engages the inclined surface of the slidable frame and moves said frame laterally.

6. An automatic starter for explosive-engines including a shaft, a spring that is wound by said shaft, a gear mounted on said shaft by a spline so as to be laterally movable, a gear connection between the engine and said slidable gear, a frame slidably mounted on said shaft that is loosely connected with said slidable gear, said frame having an inclined surface, a disk secured to said shaft having a spiral groove in the face thereof adjacent said slidable frame, notches in the extreme end of said groove, a bar mounted in the framework of the machine and reciprocating in a line parallel to said cam-disk, a pin loosely mounted in said bar, one end extending into the groove of the cam-disk, and a spring secured to said bar that tends to force said pin toward the cam-disk.

7. An automatic starter for explosive-engines including a shaft, a spring that is wound by said shaft, a gear mounted on said shaft by a spline so as to be laterally movable, a gear connection between the engine and said slidable gear, a frame slidably mounted on said shaft that is loosely connected with said slidable gear, said frame having an inclined surface, a disk secured to said shaft having a spiral groove in the face thereof adjacent said slidable frame, notches in the extreme end of said groove, a bar mounted in the framework of the machine and reciprocating in a line parallel to said cam-disk, a pin extending from said bar into the groove of said cam-disk whereby said bar will be reciprocated as the spring is being wound, and a projection from said reciprocable bar that engages the inclined surface of the slidable frame and moves said frame laterally, a pair of notches in the slidable frame, and a spring provided with a head adapted to fit in one of said notches and to hold said slidable frame in either of its positions.

8. An automatic starter for explosive-engines including a shaft, a spring that is wound by said shaft, a slidable gear on said shaft for actuating it and winding the spring, a gear connection between the engine and said slidable gear, a frame slidably mounted on said shaft that is loosely connected with said slidable gear, a disk secured to said shaft having a spiral groove in one face thereof, reciprocating means provided with a pin extending into said groove that is actuated by said cam-disk and actuates said slidable frame, whereby said spring-winding mechanism is thrown out of operation when the spring is wound, a gear meshing with the slidable gear for actuating it, a laterally-movable spindle upon which said gear is mounted, a spring for holding said gear in mesh with the slidable gear, a head on said spindle with an inclined face, an oscillatory piece with an oppositely-inclined face, and a rod extending away from the machine for actuating said oscillatory piece, whereby said gear may be moved laterally out of mesh with said slidable gear.

In witness whereof I have hereunto affixed my signature in the presence of the witnesses herein named.

GUSTUS S. BILLMAN.

Witnesses:
NELLIE ALLEMONG,
V. H. LOCKWOOD.